(12) United States Patent
Dallimore et al.

(10) Patent No.: US 11,869,291 B2
(45) Date of Patent: Jan. 9, 2024

(54) SMART LOCKER WITH ASSISTANCE FOR VISUALLY IMPAIRED USERS

(71) Applicant: Meridian Zero Degrees LLC, Aberdeen, NC (US)

(72) Inventors: Ross Dallimore, West End, NC (US); Richard Medlin, Pinehurst, NC (US); Eric Frank, Aberdeen, NC (US); Ben Misegades, Pinehurst, NC (US); Dominic Atibil, Mooresville, NC (US); Victor Graham, Carthage, NC (US); Tim Dobson, Southern Pines, NC (US); Josh Edwards, Garner, NC (US)

(73) Assignee: Meridian Zero Degrees LLC, Aberdeen, NC (US)

( * ) Notice: Subject to any disclaimer, the term of this patent is extended or adjusted under 35 U.S.C. 154(b) by 36 days.

(21) Appl. No.: 17/828,454

(22) Filed: May 31, 2022

(65) Prior Publication Data
US 2022/0383681 A1    Dec. 1, 2022

Related U.S. Application Data

(60) Provisional application No. 63/195,197, filed on Jun. 1, 2021.

(51) Int. Cl.
G07C 9/00    (2020.01)
G09B 21/00   (2006.01)

(52) U.S. Cl.
CPC ..... G07C 9/00912 (2013.01); G07C 9/00571 (2013.01); G09B 21/003 (2013.01); G09B 21/006 (2013.01); G09B 21/007 (2013.01)

(58) Field of Classification Search
None
See application file for complete search history.

(56) References Cited

FOREIGN PATENT DOCUMENTS

WO    WO-2018204962 A1  * 11/2018    ......... E05B 47/0004

* cited by examiner

*Primary Examiner* — K. Wong
(74) *Attorney, Agent, or Firm* — NK Patent Law

(57) ABSTRACT

A smart locker system with assistance for a visually impaired user is disclosed. Each locker in the smart locker system includes a beacon that emits a signal either before the locker door is released or at the same time as the locker door is released. The beacon is used by a visually impaired user to locate the specified locker before it opens or at the same time as it opens. The beacon may be a haptic device that causes the specified locker to vibrate, which allows the user to find the locker by feel. The beacon may also be an auditory device that causes the specified locker to emit a sound, which allows the user to find the locker by sound.

20 Claims, 3 Drawing Sheets

SMART LOCKER WITH ASSISTANCE FOR VISUALLY IMPAIRED USERS

CROSS-REFERENCE TO RELATED APPLICATIONS

This application claims priority to U.S. Provisional Patent Application No. 63/195,197 filed on Jun. 1, 2021, by Meridian Zero Degrees LLC, entitled "SMART LOCKER WITH ASSISTANCE FOR VISUALLY IMPAIRED USERS," the entire contents of which are incorporated by reference herein.

TECHNICAL FIELD

The invention relates to a smart locker system having location assistance for visually impaired users.

BACKGROUND

Smart locker systems have become ubiquitous in modern life. They are often used for package pickup by a user. Most smart locker systems include a plurality of lockers and a single display that the users use to access the specific locker containing their package. The single display may handle many lockers, oftentimes over 40 lockers per smart locker system. The display tells the user which of the numerous lockers is theirs, and the user then goes to that locker to retrieve their package. However, for visually impaired users, locating the specific locker can be difficult, as the user has no way of knowing which locker they are being directed to. If their locker opens before the visually impaired user is able to locate it, there is a risk of their package being stolen by another person at the smart locker.

Therefore, a need exists for a smart locker system that assists a visually impaired user in locating their specified locker.

SUMMARY

This summary is provided to introduce in a simplified form concepts that are further described in the following detailed description. This summary is not intended to identify key features or essential features of the claimed subject matter, nor is it to be construed as limiting the scope of the claimed subject matter.

A smart locker system with assistance for a visually impaired user is disclosed. Each locker in the smart locker system includes a beacon that emits a signal either before the locker door is released or at the same time as the locker door is released. The beacon is used by a visually impaired user to locate the specified locker before it opens or at the same time as it opens. The beacon may be a haptic device that causes the specified locker to vibrate, which allows the user to find the locker by feel. The beacon may also be an auditory device that causes the specified locker to emit a sound, which allows the user to find the locker by sound.

Other objects and advantages of this invention will be better appreciated from the following detailed description.

DESCRIPTION OF EMBODIMENTS

An embodiment of the smart locker system with assistance for visually impaired users is disclosed herein. The smart locker system described herein comprises a plurality of lockers that each include a digital locking mechanism to provide keyless access for storage and retrieval of packages, as is well-known in the art. The smart locker system described herein further includes one or more signaling device to assist visually impaired users with locating a specific locker.

As is well-known in the art, smart locker systems are used for providing a central location for users to pick up packages. They are used by delivery services, such as Amazon, FedEx, and UPS. The innovative aspect of the smart locker system described herein is that it provides assistance to visually impaired users in locating the user's specified locker, as described in more detail below.

Figure 1:
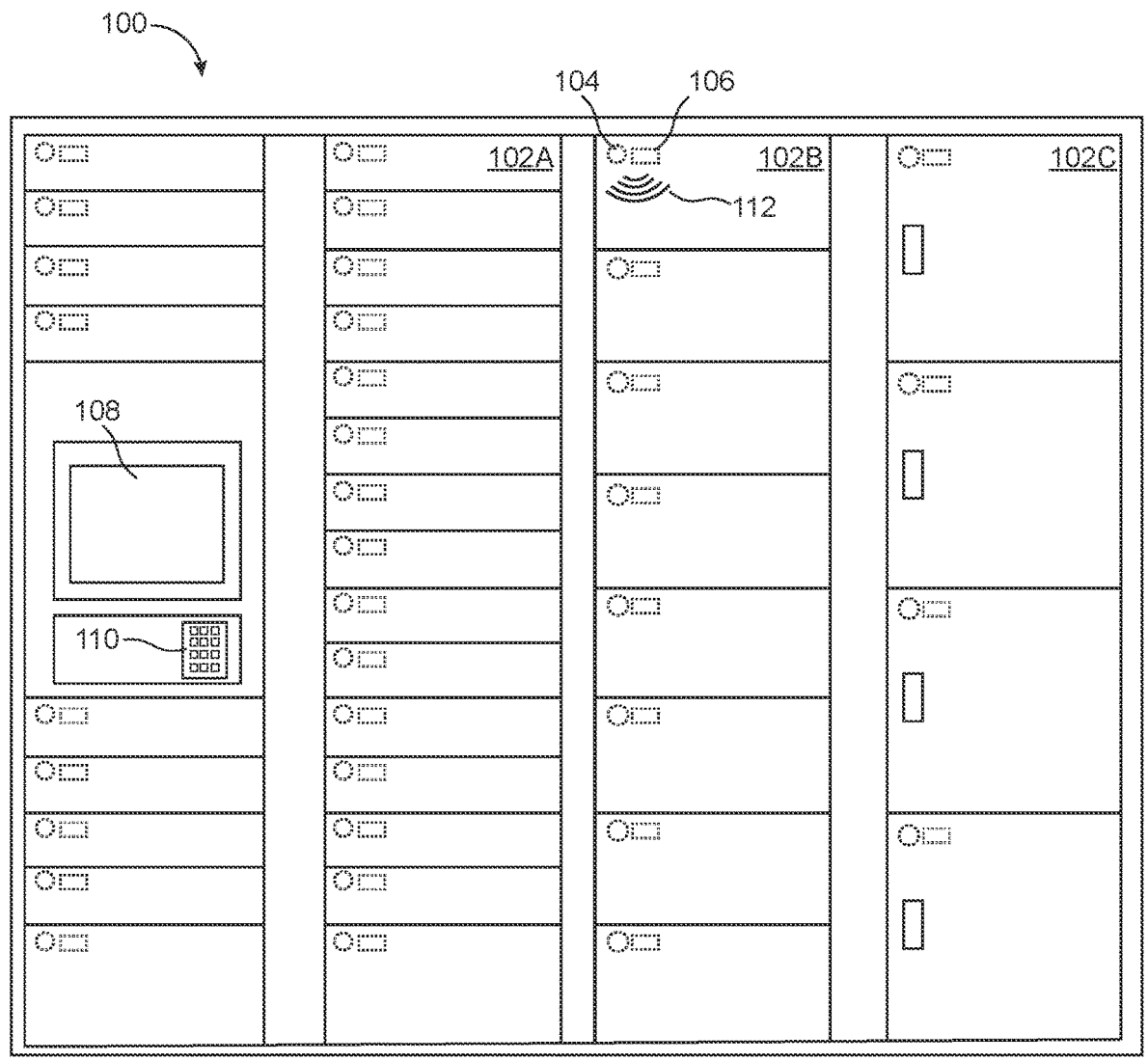
FIG. 1 depicts an exemplary embodiment of a smart locker system with assistance for visually impaired users.

FIG. 1 depicts an exemplary embodiment of a smart locker system with assistance for visually impaired users.

Referring to FIG. 1, smart locker system 100 is a smart locker system having a plurality of lockers 102a, 102b, and/or 102c. As shown in FIG. 1, the lockers may be small lockers 102a, medium lockers 102b, and/or large lockers 102c.

Access to lockers 102a, 102b, and/or 102c is controlled by a lock control system. Each locker 102a, 102b, and/or 102c includes an access door that can be locked and unlocked electronically by a signal that releases or engages an electronic locking mechanism. The electronic locking mechanism is communicatively coupled to the lock control system and is controlled by a signal received from the lock control system that causes the electronic locking mechanism to lock/unlock each locker's access door. The electronic locking mechanism provides keyless access to the locker, as is well-known in the art.

Smart locker system 100 may further include a display 108 and/or a keypad 110. The display 108 may be a touchscreen display, such as a capacitive touch screen, or it may be a display only that does not accept input. Keypad 110 may be any type of keypad that accepts user input, whether touchscreen or with physical buttons. Both display 108 and keypad 110 may be ADA-compliant for persons with visual impairment. For example, display 108 and keypad 110 may include screen-reader technology and/or braille (e.g., refreshable braille displays).

In some embodiments, the lock control system may be integrated as part of display screen 108 and/or keypad 110. The lock control system may be remote and/or distributed in that it controls multiple lockers, as opposed to each locker having its own separate lock control system.

Some or all of lockers 102a, 102b, and/or 102c include a beacon that generates a signal 112 for use by a visually impaired user to locate the specified locker. The beacon may be located inside the locker, or it may be integrated or embedded into the locker's access door or sidewall. The beacons are shown in FIG. 1 in dotted lines to indicate that they may be embedded within the door and therefore not visible on the face of the smart locker system. The beacon may be an auditory device 104 or a haptic device 106, or a device that includes both an auditory device 104 and a haptic device 106. Auditory device 104 may be a speaker. Auditory device 104 may be used to generate an audio signal that assists a visually impaired user to locate the specified locker. Haptic device 106 may be a vibration motor such as, for example, an eccentric rotating mass (ERM) vibration motor, a coin vibration motor, or a linear resonant actuator (LRA) vibration motor. In other embodiments, haptic device 106 may include other types of devices for providing haptic feedback to a user. Haptic device 106 may be used to generate a signal that can be felt by the user that assists the user to locate the specified locker.

Figure 2:
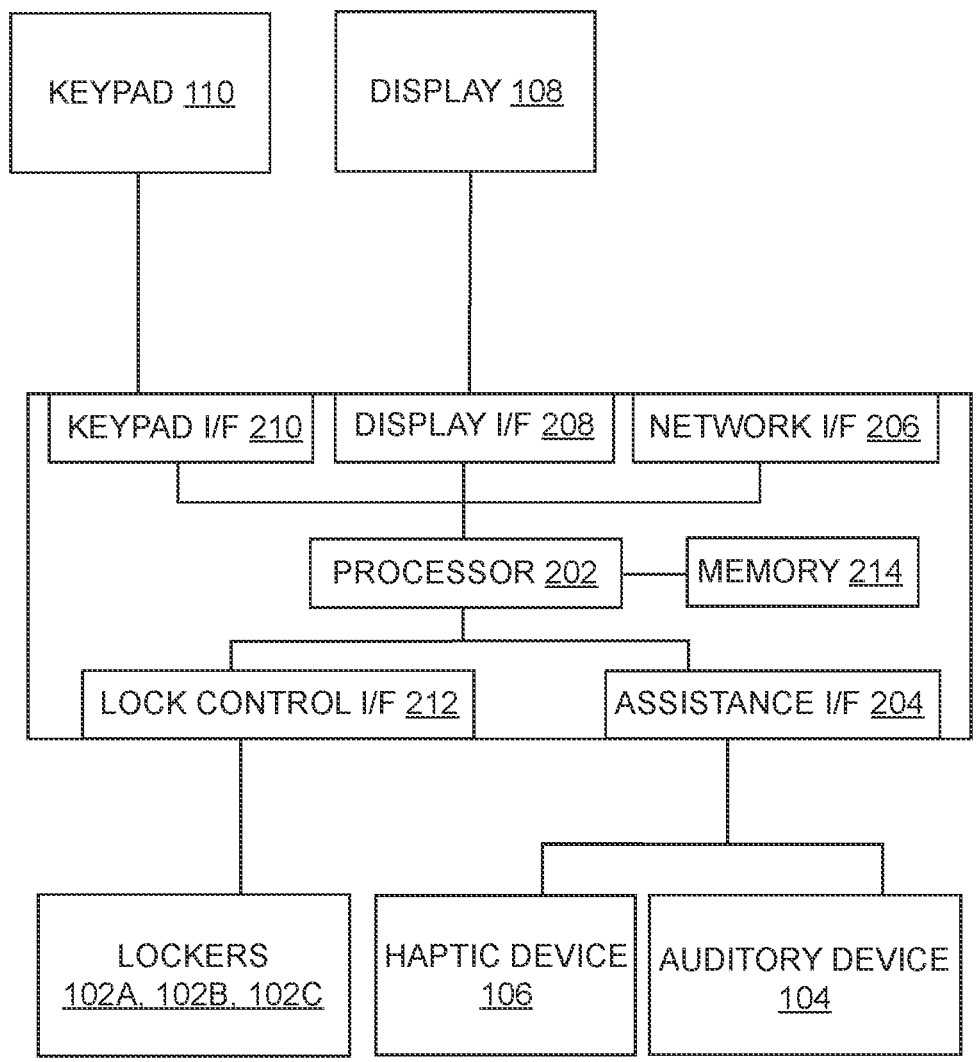
FIG. 2 depicts an exemplary electronic block diagram for the lock control system of the smart locker system with assistance for visually impaired users.

FIG. 2 depicts an exemplary electronic block diagram for the lock control system of the smart locker system with assistance for visually impaired users.

Referring to FIG. 2, the lock control system of the smart locker system may include a processor 202, an assistance interface 204, a network interface 206, a display interface 208, a keypad interface 210, a lock control interface 212, and a memory 214. These interfaces may all be separate interfaces, or may be all integrated into a single interface, or any combination thereof.

The processor 202 is communicatively coupled to the memory 214 and each of the assistance interface 204, the network interface 206, the display interface 208, the keypad interface 210, and the lock control interface 212.

The assistance interface 204 is communicatively coupled to auditory device 104 and/or haptic device 106. In one embodiment, each auditory device 104 and/or haptic device 106 may be individually addressable, for example, with each having an IP address that can be used for communication. The assistance interface 204 sends signals to the auditory device 104 and/or the haptic device 106. The signals sent to the auditory device 104 and/or the haptic device 106 causes those devices to emit signals 112 that a visually impaired user can use to locate the specific locker from which the signal 112 is being emitted.

The network interface 206 may include a wired connection and/or a wireless connection. The wired connection may be Ethernet, coaxial cable, USB, or any other type of wired connection. The wireless connection may include a cellular data connection, a Wi-Fi (e.g., 802.11 Wifi) connection, and/or a short-range wireless connection, such as Bluetooth or near-field communication (NFC). The network interface 206 may connect to a third-party server to allow communication with the third-party server to provide information about the packages and/or the users of the smart locker system. For example, the smart locker system may connect electronically through the network interface 206 to package delivery services, such as UPS, FedEx, Amazon, or the like. The smart locker system may use the connection to the third-party service to authenticate the user or direct the user to the correct locker.

The display interface 208 is communicatively coupled to display 108 and allows the processor 202 to control display 108. The display interface 208 provides output to the display 108 and receives user input from the display 108.

The keypad interface 210 is communicatively coupled to keypad 110 and allows the processor to control keypad 110. The keypad interface 210 receives user input from the keypad 110. In embodiments where the keypad 110 is a digitally displayed keypad, the keypad interface 210 provides output for the keypad 110 as well.

The lock control interface 212 is communicatively coupled to the electronic locking mechanism of each locker 102a, 102b, and/or 102c. In one embodiment, each electronic locking mechanism of the lockers 102a, 102b, and/or 102c may be individually addressable, for example, with each having an IP address that can be used for communication. They may share the same IP address as the auditory device 104 and/or haptic device 106, or they may be separate. The lock control interface 212 sends a signal to the electronic locking mechanism for a specified locker to lock or unlock that specified locker.

The memory 214 may include instructions that when executed by the processor 202 cause the lock control system to control access to the smart locker system. The instructions may make up a smart locker system control software that is embodied as a computer control code.

The lock control system may be accessible by the display 108 and/or the keypad 110. Additionally, the lock control system may be accessible remotely via a mobile application on a user's mobile device. In one embodiment, the mobile device may connect to the lock control system via network interface 206.

Regardless of how the user accesses the lock control system, once the user has been authenticated, the lock control system opens the correct locker for the particular user that is requesting access (either via the display or via a mobile application). The lock control system may, either before opening the locker or simultaneously with the opening of the locker, may transmit a signal to the beacon for the specified locker being opened to cause the beacon to emit a signal 112. The signal 112 may be either a tone played out of auditory device 104, or a vibration emitted from haptic device 106, or both.

In one embodiment, the beacon signal 112 may be generated for a predetermined amount of time to allow the user to locate the specified locker before releasing the lock to open the locker.

In other embodiments, the beacon signal 112 may be generated for a predetermined amount of time but at the same time as releasing the lock to open the locker.

The beacon signal 112 may be of any type that can be used to assist a user in locating the locker. For example, it may be a steady signal, such as a steady tone from auditory device 104 and a steady vibration from haptic device 106. Or it may be a pulsed signal, or an ascending signal that gets stronger over time (e.g., louder in the case of auditory, and stronger vibration in the case of haptic), or a descending signal that gets weaker over time. In some embodiments, the beacon signal may be emitted for a predetermined amount of time. In other embodiments, the beacon signal may be emitted until the locker is closed by the user, so that the control system knows that the user has located the specified locker.

In other embodiments, multiple beacons may be used in a radial manner moving away from the display 108 such that the user can follows the path. In other words, if the specified locker is located two lockers to the right and two lockers up from the display (where the user is standing), then the beacon signal may be first emitted for a short time from the locker directly to the right of the display, then for a short time from the locker directly to the right of that locker, then for a short time from the locker directly above that locker, and so on until the beacon of the specified locker emits a signal. In this way, the user standing at the display may follow the lockers by feel or by sound as the beacon signal travels from locker to locker to the specified locker.

The lock control system may be configured to communicate with a remote entity, such as a cloud server. The remote entity may receive information from the lock control system and one or more electronic locking mechanisms such that a display is not needed for the smart locker system.

Figure 3:
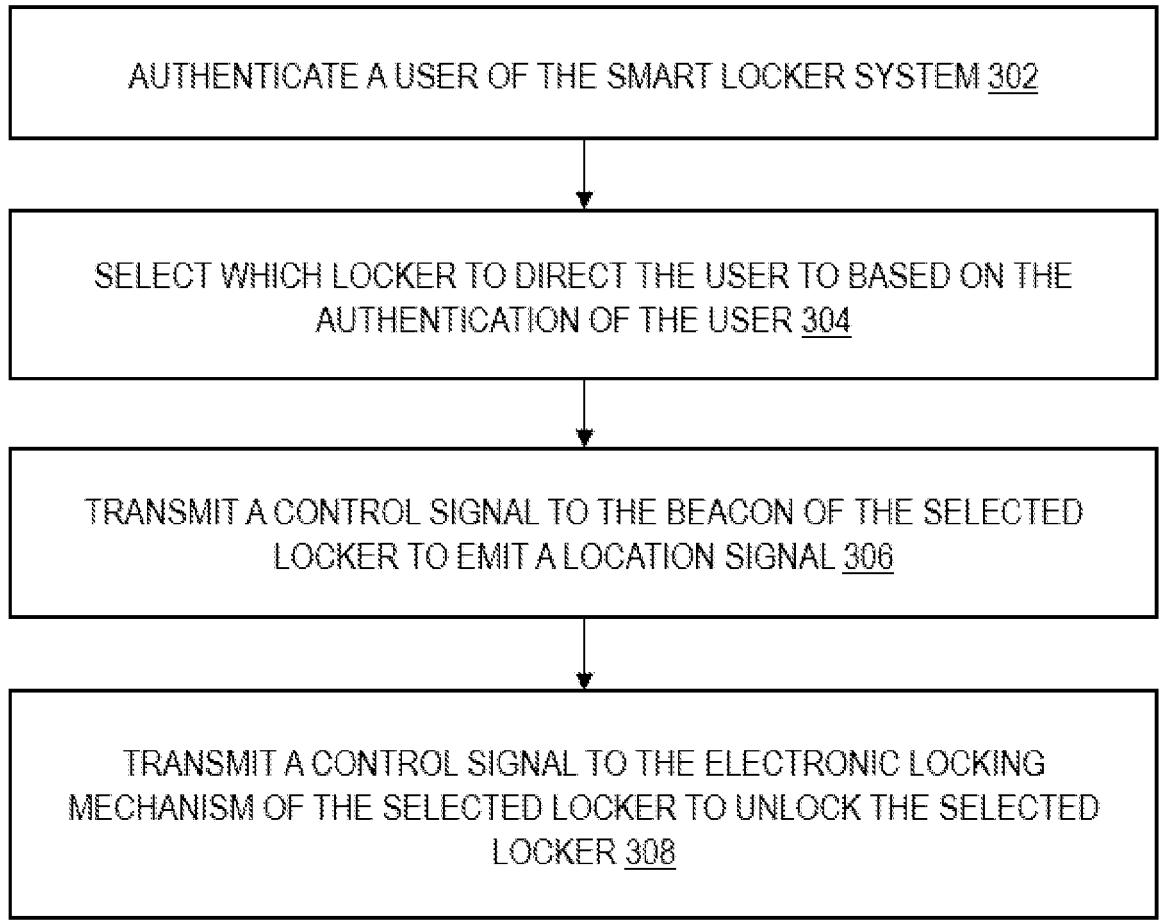
FIG. 3 depicts an exemplary process flow for the lock control system of the smart locker system with assistance for visually impaired users.

FIG. 3 depicts an exemplary process flow for the lock control system of the smart locker system with assistance for visually impaired users. The process flow shown in FIG. 3 may be implemented by a processor of the smart locker system described herein.

Referring to FIG. 3, the processor of the smart locker system and/or of the lock control system of the smart locker system is configured to perform the steps of FIG. 3. For example, the processor is configured for authenticating a user of the smart locker system, at block 302. The user may be authenticated, for example, by using a keypad to enter a code, by performing a biometric scan, by scanning a QR code or other identification tag, or by connected to the smart locker system using a mobile device, such as a smartphone. The user may be authenticated locally at the smart locker system, or the authentication may be performed by a third-party authentication server communicatively coupled to the smart locker system. The processor is further configured for selecting which locker of the plurality of lockers to direct the user to based on the authentication of the user, at block 304. For example, once the smart locker system has identified the user, the smart locker system can determine which locker to direct the user to. This may be performed using a lookup based on the user's authentication information. The processor is further configured for transmitting a control signal to the beacon of the selected locker to cause the beacon of the selected locker to emit the location signal, at block 306. The processor is further configured for transmitting a control signal to the electronic locking mechanism of the selected locker to cause the selected locker to unlock such that the authenticated user can access the selected locker, at block 308. As described above, in various embodiments, the location signal emitted by the beacon is a haptic signal that is felt on the face of the smart locker system by the user. In some embodiments, the location signal emitted by the beacon is an audio signal that is heard by the user. In some embodiments, the location signal emitted by the beacon is emitted for a predetermined amount of time before the selected locker is unlocked, Although the subject matter described herein is described in the context of a smart locker system, a person of ordinary skill in the art will appreciate that the concepts and principles described herein may be applied to other types of group storage systems, such as kiosks, vending machines, charging stations for electronic devices, and the like.

As will be appreciated by one skilled in the art, aspects of the present invention may be embodied as a system, method, or computer program product. Accordingly, aspects of the present invention may take the form of an entirely hardware embodiment. Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a," "an," and "the" refer to "one or more" when used in the subject specification, including the claims. Thus, for example, reference to "a device" can include a plurality of such devices, and so forth.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A smart locker system that assists a visually impaired user with locating a specified locker in a plurality of lockers, the smart locker system comprising:
a plurality of lockers having an electronic locking mechanism controlled by a lock control system, each locker having a beacon for emitting a signal for use by a visually impaired user to locate the specified locker.

2. The smart locker system of claim 1, wherein the beacon is a haptic device.

3. The smart locker system of claim 2, wherein the signal emitted by the beacon is a haptic signal that is felt on the face of the smart locker system by the user.

4. The smart locker system of claim 1, wherein the beacon is an auditory device.

5. The smart locker system of claim 4, wherein the signal emitted by the beacon is an audio signal that is heard by the user.

6. The smart locker system of claim 1, wherein the beacon includes a haptic device and an auditory device.

7. The smart locker system of claim 6, wherein the signal emitted by the beacon includes a haptic signal and an auditory signal emitted simultaneously.

8. The smart locker system of claim 1, wherein the signal emitted by the beacon is emitted for a predetermined amount of time.

9. The smart locker system of claim 1, wherein the signal emitted by the beacon is emitted until the specified locker has been accessed by the user.

10. The smart locker system of claim 1, wherein the signal emitted by the beacon varies in intensity over time.

11. The smart locker system of claim 10, wherein the intensity of signal emitted by the beacon decreases over time.

12. The smart locker system of claim 10, wherein the intensity of signal emitted by the beacon increases over time.

13. The smart locker system of claim 1, wherein the lock control system unlocks the specified locker after the signal has been transmitted from the beacon for a predetermined amount of time.

14. The smart locker system of claim 1, wherein the lock control system provides keyless access to one or more of the plurality of lockers by remotely unlocking the electronic locking mechanism for the specified locker.

15. The smart locker system of claim 1, wherein the beacon is embedded within an access door of a locker.

16. The smart locker system of claim 1, wherein the beacon is located within a locker.

17. A smart locker system that assists a visually impaired user with locating a specified locker in a plurality of lockers, the smart locker system comprising:
a lock control system comprising a processor; and
a plurality of lockers, each locker having an electronic locking mechanism controlled by the lock control system and beacon for emitting a location signal for use by a visually impaired user to locate the specified locker;
wherein the processor of the lock control system is configured for:
authenticating a user of the smart locker system;
selecting which locker of the plurality of lockers to direct the user to based on the authentication of the user;
transmitting a control signal to the beacon of the selected locker to cause the beacon of the selected locker to emit the location signal; and
transmitting a control signal to the electronic locking mechanism of the selected locker to cause the selected locker to unlock such that the authenticated user can access the selected locker.

18. The smart locker system of claim 17, wherein the location signal emitted by the beacon is a haptic signal that is felt on the face of the smart locker system by the user.

19. The smart locker system of claim 17, wherein the location signal emitted by the beacon is an audio signal that is heard by the user.

20. The smart locker system of claim 17, wherein the location signal emitted by the beacon is emitted for a predetermined amount of time before the selected locker is unlocked.

* * * * *